United States Patent Office 3,247,919
Patented Apr. 26, 1966

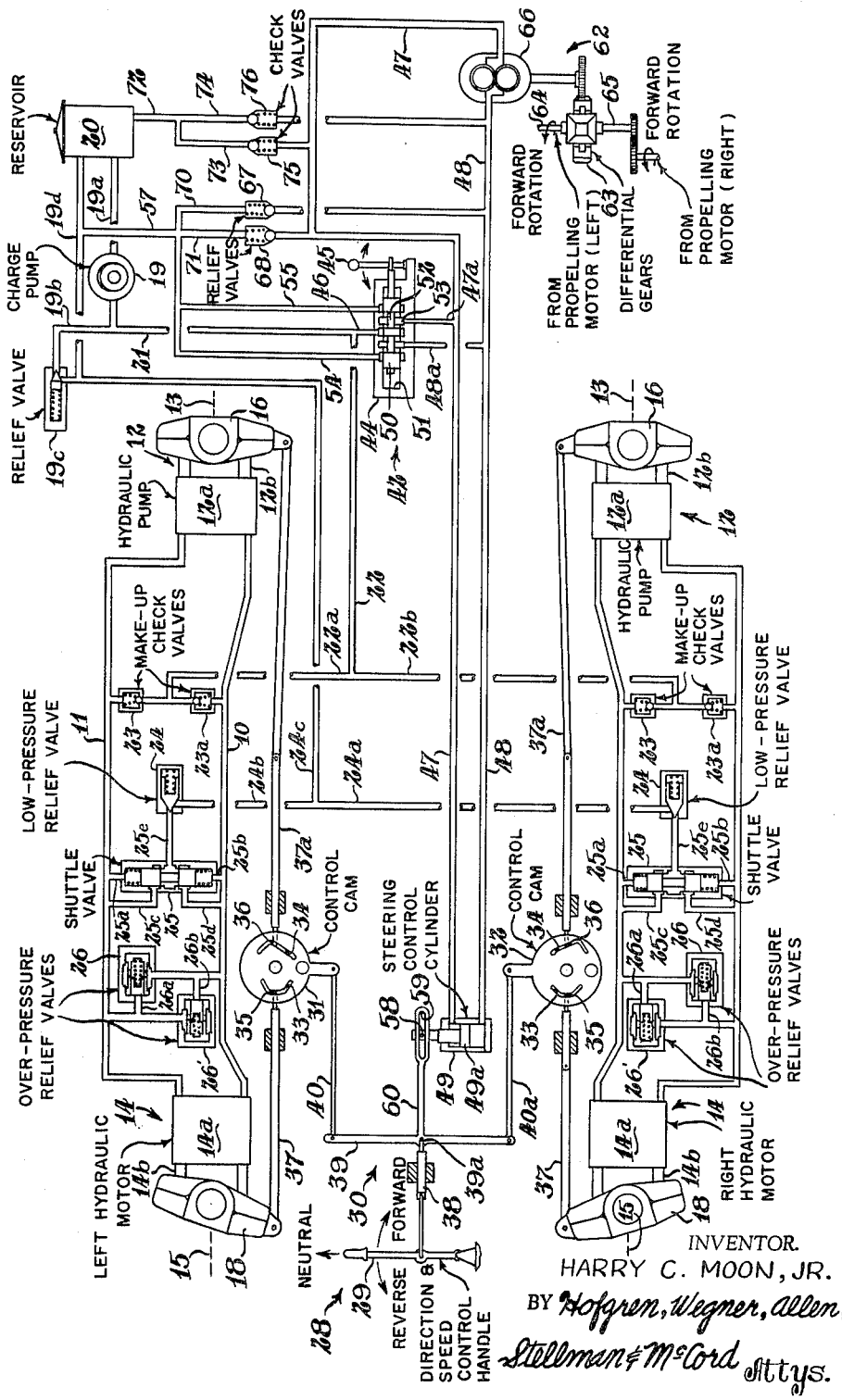

3,247,919
HYDROSTATIC TRANSMISSION
Harry C. Moon, Jr., Rockford, Ill., assignor to Sundstrand Corporation, a corporation of Illinois
Filed Nov. 21, 1963, Ser. No. 325,384
5 Claims. (Cl. 180—6.48)

This application relates to vehicle power systems and more particularly to a new and improved steering system for a vehicle having driven propelling means movable at different speeds for purposes of steering.

It is a general object of this invention to provide a new and improved steering system for vehicles with hydraulic transmissions such as crawler-type vehicles, including tractors and the like, which utilize independent right and left propelling wheels or tracks, wherein steering is accomplished by adjusting the relative speed of the wheels or tracks at the opposite sides of the vehicle.

It is another object of this invention to provide a new and improved means providing for accurate straight line tracking for a crawler-type vehicle.

It is still another object of this invention to provide a new and improved control for a steering system for a hydraulic vehicle transmission which senses the difference between the speeds of two vehicle power systems and sends a direct command to properly balance the speed between the two hydraulic systems.

An additional object is to provide a hydraulic system having a gear-type differential with an output responsive to the difference between the speeds of two hydraulic motors, a fixed displacement pump to convert the output to a hydraulic signal, and a piston and cylinder device associated with the speed control for the hydraulic motors and in constant communication with the pump for continuous reception of the hydraulic signal imparted thereby for balancing the speeds of the hydraulic motors independent of the steering system for the vehicle and providing a feedback signal during turning.

Further objects and advantages will become apparent from the following detailed description taken in connection with the accompanying drawings, in which:

The single figure is a diagrammatic illustration of a differential speed control steering system embodying the principles of the present invention.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Referring now to the drawings, two closed-circuit fully reversible hydrostatic transmissions A and B are shown. Since the two circuits are identical they will be discussed together with common reference numerals for common components.

Each circuit includes main lines 10 and 11 as well as a pump 12 driven by an appropriate prime mover (not shown) in a well known manner schematically represented by line 13 for pumping hydraulic fluid through the lines to drive the motors 14. The pumps 12 may be of a well known axial piston, variable displacement type including a rotatable cylinder block 12a with pistons 12b and having a reversible swashplate 16 for appropriately varying the displacement of the pump. The fluid output of the pumps is appropriately conducted to the motors through lines 10 or lines 11, depending upon the direction in which the swashplates 16 are moved from the neutral center position shown. The motors in turn each drive an output shaft schematically represented by line 15 for driving right and left propelling wheels or tracks of a vehicle intended to be steered by varying the speed of one motor relative to the other. The motors may also be of a well known axial piston type including a rotatable cylinder block 14a with pistons 14b and having a variable angle swashplate 18 movable in one direction from neutral for varying displacement of the motors and simultaneously inversely varying the speed thereof.

A charge pump or replenishing pump 19 is in communication with each circuit for supplying additional hydraulic fluid thereto to replace the loss through leakage and the like. The charge pump draws control fluid through the conduit 19a from the reservoir 20 and pumps the fluid into the transmission through the conduits 21 and 22. The capacity of the pump is sufficient to restore leakage fluid, to supply control fluid to the appropriate valves and to supply cooling fluid to the circuit in excess of that required for makeup and control purposes to displace heated fluid and maintain the transmission cool. Through the conduit 22 and its branches 22a and 22b the charge pump 19 is kept in communication with the spring-biased makeup check valves 23 and 23a of each system A and B. These valves permit the pumped fluid to enter each circuit on the low pressure side thereof through one check valve while pressure in the high pressure conduit maintains its associated check valve closed. If the pump 19 pumps more fluid than the hydraulic circuit requires, then the excess fluid will be by-passed through conduit 19b, through the spring-biased makeup relief valve 19c and back to the reservoir through the conduit 19d.

Each circuit is further provided with a low pressure relief valve means which includes a low pressure relief valve 24 and a shuttle valve 25. The purpose of the low pressure relief valve is to provide a means for removing heated oil replaced by cooling oil supplied by the charge pump. As oil on the high pressure side moves the spring centered shuttle valve through conduit 25a or 25b, heated oil from the low pressure side will be permitted to pass by conduit 25c or 25d through the shuttle valve and by conduit 25e through the low pressure relief valve, and return to the reservoir 20 by means of the conduits 24a and 24b which merge into the conduit 24c. From conduit 24c the fluid flows through conduit 19d into the reservoir.

Each system is further provided with overpressure relief valves 26 and 26'. These overpressure relief valves prevent abnormally high pressure in either side of the main hydraulic line by relieving the hydraulic circuit of surge pressures and the like. This is accomplished by dumping oil to the low pressure side in response to high pressures which move the valves during rapid acceleration, abrupt braking or similar conditions which might cause surge pressure. If, for example, such high pressure should occur in line 11, pressure in conduit 26a would actuate valve 26 to relieve pressure through conduit 26b to the opposite line.

For changing the angle of the motor swashplates and pump swashplates and thereby varying the torque and speed of each motor there is provided a manually operable signal input means 28. Signal input means 28 includes a manually movable handle 29 connected through suitable linkage indicated generally at 30 to control cams 31 and 32 operably associated with the pump and motor swashplates of each circuit. Each control cam 31 and 32 has a pair of appropriately curved generally arcuate slots 33 and 34. Positioned in the slots are pins 35 and 36 respectively, which pins are secured to the ends of rods 37 and 37a pivotally mounted to the pump and motor swashplates 16 and 18, respectively, for pivoting the swashplates in response to arcuate movement of the control cam which causes a linear displacement of the pin. The slots are so designed so that the motor and pump swashplates will be staged to hold the motor swashplate at maximum displacement, maximum torque, minimum speed position as shown, while bringing the pump into stroke to start the transmission. As the pump approaches maximum displacement, the motor displacement is reduced, decreasing torque and increasing speed. On reducing transmission speed, the staging is reversed to first increase motor displacement and then reduce pump displacement. Since both the hydraulic systems A and B are fully reversible, movement of the manually operated lever 29 in the desired direction will appropriately position the swashplates to impart the desired direction of travel to the vehicle, that is, forwardly or reversely.

The linkage means 30 includes a control input shaft 38 pivoted to and generally extending normal to the manually operable handle 29. The control input shaft 38 is similarly pivoted at 39a to the differential steering link 39 which is normally generally transverse to the shaft 38 and parallel to the handle 29. At either end of the steering link 39 are pivotally mounted the cam input links 40 (for the left side) and 40a (for the right side). These cam input links are pivotally mounted at their opposite ends to the control cams 31 and 32, respectively, for rotating the cams and thereby linearly moving the pins 35 and 36 in response to appropriate movement of the handle 29.

For steering the vehicle there is provided a steering means 42 which acts to change the relative speed of the two hydraulic motors so that the speed difference will cause a desired directional turning movement to be imparted to the vehicle. Included in the steering means 42 is a steering control valve 44 which is controlled by a manually operable handle 45. The steering control valve 44 meters hydraulic fluid from the charge pump 19 and conduit 21 by way of a conduit 46 through appropriate lands and grooves into an appropriate steering control conduit 47 or 48 through the access conduit 47a or 48a, respectively, to actuate a piston in a steering control cylinder 49 in a direction depending on the directional movement imparted to the valve. The steering control conduits 47 and 48 are in constant communication with opposite sides of the steering control cylinder 49. Movable piston 49a in the cylinder 49 is adapted to move in response to the hydraulic pressure on either side thereof.

The control valve 44 includes a valve stem or piston 50 slidably mounted in valve bore 51. The stem 50 has suitable reduced diameter portions 52 and the bore 51 has suitable annular grooves 53 to facilitate appropriate valving of control fluid.

As shown in the figure, the valve is in a neutral position with the stem blocking the flow of fluid from conduit 46 to both conduits 47a and 48a. The drain conduits 54 and 55 are also closed so that no fluid may be exhausted from the steering control cylinder.

As the handle is moved to steer the vehicle, for example, to execute a left turn, the stem will move toward the right in the figure. This movement establishes communication of pumped fluid between the conduits 46 and 48a as well as establishing a drain communication between the conduits 47a and 55 to drain the conduit 47. The drained fluid is directed to the reservoir by way of conduits 56, 57 and 19d. The pumped fluid is directed to the steering control cylinder through the conduit 48 where it will be utilized to move the piston 49a, which, in turn, will transmit a signal, by appropriate means, to the two transmissions to reduce the speed of the left transmission and increase the speed of the right transmission so that the vehicle will turn in the desired direction. Conversely, movement of the valve stem to the left for the purpose of making a right turn will drain the conduit 48 and pump fluid through the conduit 47, so that the desired right turn may be executed.

To vary the relative speed of the two motors, the control piston 49a is operatively associated with the linkage 30. At the free end of the piston 49a is a transversely extending pin 58 positioned in a slot 59 of a control shaft 60 which is a rigidly mounted extension from differential steering link 39. As the piston travels generally parallel to the link 39 and transverse to the arm 60 in response to fluid from the conduit 47 or 48, the link 39 is pivoted about the mounting at 39a, so that the cam links 40 and 40a move in opposite directions. Thus, relative vertical movement of the piston 49a, by means of the aforementioned linkage, will cause the two control cams 31 and 32 to be displaced in opposite directions. As the control cams are moved in opposite directions the swashplates will be oppositely moved increasing the displacement of one motor and decreasing the displacement of the other, creating a difference in speed between the two motors and thereby enabling a steering movement to be imparted to the vehicle.

Further included in the system of this invention is an automatic control means 62 which performs the function of maintaining the vehicle in a straight line of travel when no steering command has been imparted thereto and of providing a feedback signal on execution of a turn to neutralize piston 49a upon attainment of a speed difference called for in response to a steering command. Included in the automatic control means is a mechanical differential 63 which is operatively connected to the left and right motors by shafts 64 and 65 for sensing the relative speed of the propelling wheels and producing an output signal of a magnitude and in a direction proportional to the difference in speed of the motors in response to the sensing. This output signal from the differential is transmitted to a reversible steering pump 66 to cause pumping from an appropriate side thereof dependent upon the steering or tracking conditions of the vehicle.

The pump 66 is in constant communication with the steering control cylinder 49 by means of the conduits 47 and 48 each of which communicates with one of the two sides of the cylinder at all times, and movement of piston 49a is directly proportional to movement of pump 66. Thus, any signal imparted by the differential 62 indicative of a difference in relative speed of the two motors may be directly compensated for by appropriately pumping fluid through one of the conduits 47 or 48 to the control cylinder without passing through intermediate valving or the like which might tend to attenuate the original hydraulic signal given or delay the transmission of the signal for a brief moment of time. As the pumped fluid is received on the appropriate side of the steering control cylinder the piston responds accordingly to so position the control cams through the aforementioned linkage that the motor swashplates will be relatively positioned for applying a uniform speed to the wheels or tracks at both sides of the vehicle.

Spring-biased relief valves 67 and 68 are provided in conduits 70 and 71, respectively, which communicate with the conduits 47 and 48, respectively, to relieve the conduits 47 and 48 of excess fluid. The conduits 70 and 71 communicate with conduit 57, and through conduit 19d the excess fluid may return to the reservoir.

Conduit 72 leads from the reservoir to makeup conduits 73 and 74, each of which includes a spring-biased makeup valve 75 and 76, respectively, and communicates with the conduits 47 and 48, respectively, to supply fluid to pump 66.

In operation, as the vehicle is being driven in a straight line, the steering control valve 44 is in the center or neutral position as shown in the drawing with all the conduits and ports blocked as previously described. As the vehicle is driven forward, the handle 29, input shaft 38, and the two cam input links 40 and 40a are forwardly displaced. The control cams 32 are rotated to cause the pins 35 and 36 to pull the rods 37 and 37a so that the swashplates 18 and 16, respectively, are positioned appropriately so that the motors produce a positive forward driving motion for transmission to the wheels or tracks through suitable means. If the wheel or track at one side, the left side, for example, goes faster than that at the right side, due, for example, to less efficiency or more slippage in the right transmission, control means 62, and in particular the differential 63, senses this relative difference in speed and rotates the steering pump 66 to pump to the left. The steering pump takes oil from the conduit 47 and pressurizes the conduit 48 which causes an upward movement of the piston 49 and thereby pivots the steering link 39 about point 39a as previously described. This tends to reduce the forward displacement of the left side input link 40a and increase the forward displacement of the right side link 40 so that the left side motor tends to slow down and the right side motor tends to speed up. When both sides reach the same output speed the differential does not sense any relative speed difference and therefore ceases to send a signal to the pump 66 and the system is in balance.

When a turning movement is being imparted by means of the steering control valve, the valve meters oil from the charge pump 19 into an appropriate conduit 47 or 48 to displace the piston in the steering control cylinder as previously described. During this time the differential senses the difference in relative speed of the two transmissions and sends a signal to the steering pump 66 which will send fluid into the opposite conduit to the opposite side of the piston 49a. When the flow through the steering pump 66 equals the flow through the steering valve 44, the piston 49a in the steering control cylinder 49 comes to rest so that the rate of turn is proportional to the flow through the steering valve 44. If the relative speeds of the two sides depart from that called for by the manual control during execution of a turn, the automatic control senses the departure and corrects for such departure. When the steering control valve is centered, the steering pump will restore the steering control piston to a center position to impart straight line movement to the vehicle.

The hydrostatic transmission of this invention provides a means for producing an individual speed control to each of the driven members of a crawler-type, speed steering vehicle. This is accomplished by means of individual, infinitely variable ratio transmissions between the prime mover and the driven wheels. Furthermore, the system of this invention senses a change in the relative speed of the two separate transmissions and automatically corrects the infinitely variable transmissions to keep the vehicle in a straight line of travel. Any time that the steering control of the vehicle is not being utilized the two transmissions are constantly able to maintain the vehicle in a straight line movement. The steering balancing means of this invention is constantly in direct communication with opposite sides of the steering control means so that signals may be directly imparted thereto for instantaneous corrections of deviation in vehicle travel so that the vehicle may be maintained in accurate straight line movement when more steering commands are being directed thereto. The importance of such a control will be appreciated when it is understood that it is extremely difficult for an operator of a tractor or the like to visually sense minor deviations of the vehicle from a straight line path when it is often very important, as in agricultural work, for example, to maintain straight line travel.

I claim:

1. A steering system for a vehicle having separate propelling means at opposite sides thereof movable at the same speed for purposes of straight tracking and at different speeds for purposes of steering, comprising: a pair of drive shafts at opposite sides of the vehicle respectively adapted for connection with the propelling means; a pair of variable displacement hydraulic motors respectively connected to the drive shafts for driving the latter; means for supplying fluid under pressure to drive the motors; separate means respectively for varying the displacement of the motors and thereby the speed thereof; manually controllable means mechanically connected to the displacement varying means for varying displacement of the motors; and means for controlling the displacement varying means to cause the vehicle to track in a straight line including, means connected to said drive shafts for sensing a difference in speed of the drive shafts relative to each other and producing a signal proportional in direction and magnitude to the difference, a control pump responsive to said sensing means signal for supplying control fluid under pressure in a direction and at a rate proportional to said difference, and a piston and cylinder device having opposite sides in constant open communication with opposite sides of said control pump respectively and mechanically connected to said manually controllable means for varying the displacement of the motors differently to equalize the speeds thereof.

2. A steering system for a vehicle having separate propelling means at opposite sides thereof movable at the same speed for purposes of straight tracking and at different speeds for purposes of steering, comprising: a pair of drive shafts at opposite sides of the vehicle respectively adapted for connection with the propelling means; a pair of hydrostatic transmissions respectively connected to the drive shafts for driving the latter, each transmission including a pump device, a motor device communicating with the pump device, and means for varying the displacement of at least one device relative to the other thereby to vary the input-to-output speed ratio thereof; manually controllable means connected to the displacement varying means for varying the speed of the transmissions similarly to vary the speed of the vehicle and to vary the speed of the transmissions differently for turning the vehicle; and means for controlling the displacement varying means to cause the vehicle to track in a straight line including, means connected to said drive shafts for sensing a difference in speed of the drive shafts relatively to each other and producing a signal proportional in direction and magnitude to the difference, a control pump responsive to said sensing means signal for supplying control fluid under pressure in a direction and at a rate proportional to said difference, and a piston and cylinder device having opposite sides in constant open communication with opposite sides of said control pump respectively and mechanically connected to said manually controllable means for varying the speed of the transmissions differently to equalize the speeds thereof.

3. A steering system for a vehicle having separate propelling means at opposite sides thereof movable at the same speed for purposes of straight tracking and at different speeds for purposes of steering, comprising: a pair of drive shafts at opposite sides of the vehicle respectively adapted for connection with the propelling means; a pair of hydrostatic transmissions respectively connected to the drive shafts for driving the latter, each transmission including a variable displacement pump, a variable displacement motor communicating with the pump, and displacement varying means for holding the displacement of the motor at a maximum value while bringing the pump into stroke and then reducing the displacement of the motor thereby to bring the transmission up to speed, and conversely, for increasing the displacement of the motor and then reducing the displacement of the pump thereby to reduce the speed of the transmission; manually controllable means connected to the displacement varying means for varying the speed of the transmissions similarly to vary the speed of the vehicle and to vary the speed of the transmissions differently for turning the vehicle; and means for controlling the displacement varying means to cause the vehicle to track in a straight line including, means connected to said drive shafts for sensing a difference in speed of the drive shafts relative to each other and producing a signal proportional in direction and magnitude to the difference, a control pump responsive to said sensing means signal for supplying control fluid under pressure in a direction and at a rate proportional to said difference, and a piston and cylinder device having opposite sides in constant open communication with opposite sides of said control pump respectively and mechanically connected to said manually controllable means for varying the speed of the transmissions differently to equalize the speeds thereof.

4. A steering system for a vehicle having separate propelling means at opposite sides thereof movable at the same speed for purposes of straight tracking and at different speeds for purposes of steering, comprising: a pair of drive shafts at opposite sides of the vehicle respectively adapted for connection with the propelling means; a pair of hydrostatic transmissions respectively connected to the drive shafts for driving the latter, each transmission including a pump device, a motor device communicating with the pump device, and means for varying the displacement of at least one device relative to the other thereby to vary the input-to-output speed ratio thereof; manually controllable means mechanically connected to the displacement varying means for moving the latter in a first mode to vary the speed of the transmissions similarly to vary the speed of the vehicle; means for varying the speed of the transmissions differently for turning the vehicle including, a piston and cylinder device mechanically connected to the manually controllable means for moving the latter in a second mode to vary the speed of the transmissions differently for turning the vehicle, a source of control fluid under pressure, and manually operable valve means for controlling the flow of control fluid to opposite sides of the piston and cylinder device; and means for controlling the displacement varying means to cause the vehicle to track in a straight line including, means connected to said drive shaft for sensing a difference in speed of the drive shafts relative to each other and producing a signal proportional in direction and magnitude to the difference and a reversible control pump having opposite sides in constant open communication with opposite sides of said piston and cylinder device and responsive to said sensing means signal for supplying control fluid under pressure to said piston and cylinder device in a direction and at a rate proportional to said difference to tend to equalize the speeds of the transmissions.

5. A steering system for a vehicle having separate propelling means at opposite sides thereof movable at the same speed for purposes of straight tracking and at different speeds for purposes of steering, comprising: a pair of drive shafts at opposite sides of the vehicle respectively adapted for connection with the propelling means; a pair of variable displacement hydraulic motors respectively connected to the drive shafts for driving the latter; means for supplying fluid under pressure to drive the motors; separate means respectively for varying the displacement of the motors and thereby the speed thereof; mechanical linkage means connected to both of said displacement varying means and movable in one direction to increase the displacement of one of said hydraulic motors and to reduce the displacement of the other of said hydraulic motors, and movable in the other direction to increase the displacement of said other hydraulic motor and to reduce the displacement of said one hydraulic motor; and means for controlling the displacement varying means to cause the vehicle to track in a straight line including, means connected to said drive shafts for sensing a difference in speed of the drive shafts relative to each other and producing a signal proportional in direction and magnitude to the difference, a control pump responsive to said sensing means signal for supplying control fluid under pressure in a direction and at a rate proportional to said difference, and a piston and cylinder device having opposite sides in constant open communication with opposite sides of said control pump respectively and mechanically connected to said mechanical linakge means for varying the displacement of the motors differently to equalize the speeds thereof.

References Cited by the Examiner

UNITED STATES PATENTS

| 3,025,722 | 3/1962 | Eger et al. | 74—711 |
| 3,085,403 | 4/1963 | Hamblin et al. | 60—97 |

FOREIGN PATENTS

| 137,017 | 3/1961 | Russia. |

BENJAMIN HERSH, *Primary Examiner.*

A. HARRY LEVY, *Examiner.*